United States Patent
Arafat et al.

(10) Patent No.: US 12,362,688 B2
(45) Date of Patent: Jul. 15, 2025

(54) SYSTEMS AND METHODS FOR CONTROL OF MULTI-PHASE MACHINES

(71) Applicant: Cummins Inc., Columbus, IN (US)

(72) Inventors: Akm Arafat, Blaine, MN (US); Dakshina Murthy-Bellur, Plymouth, MN (US); Santhosh Krishnamoorthi, Indianapolis, IN (US); Shankari Bangalore Kalyanam Ramnath, Columbus, IN (US)

(73) Assignee: Cummins Inc., Columbus, IN (US)

( * ) Notice: Subject to any disclaimer, the term of this patent is extended or adjusted under 35 U.S.C. 154(b) by 101 days.

(21) Appl. No.: 18/034,830

(22) PCT Filed: Oct. 15, 2021

(86) PCT No.: PCT/US2021/055211
§ 371 (c)(1),
(2) Date: May 1, 2023

(87) PCT Pub. No.: WO2022/093555
PCT Pub. Date: May 5, 2022

(65) Prior Publication Data
US 2023/0412097 A1   Dec. 21, 2023

Related U.S. Application Data
(60) Provisional application No. 63/108,481, filed on Nov. 2, 2020, provisional application No. 63/117,547, filed on Nov. 24, 2020.

(51) Int. Cl.
H02P 6/08 (2016.01)
H02P 5/74 (2006.01)
(Continued)

(52) U.S. Cl.
CPC ............... *H02P 5/74* (2013.01); *H02P 23/12* (2013.01)

(58) Field of Classification Search
CPC .. H02P 23/009; H02P 5/74; H02P 6/08; H02P 25/22; H02P 23/12; H02P 2207/05
(Continued)

(56) References Cited

U.S. PATENT DOCUMENTS 6,201,720 B1  3/2001  Tracy et al.
9,985,566 B2  5/2018  Jiang
(Continued)

FOREIGN PATENT DOCUMENTS

CN  103401503 B  11/2013
CN  109149983 B  1/2019
(Continued)

OTHER PUBLICATIONS

International Preliminary Report on Patentability received for PCT Patent Application No. PCT/US2021/055211, mailed on May 11, 2023, 11 pages.
(Continued)

*Primary Examiner* — Gabriel Agared
(74) *Attorney, Agent, or Firm* — Faegre Drinker Biddle & Reath LLP

(57) ABSTRACT

A system and method for controlling a six-phase machine include generating a plurality of control vectors for the six-phase machine. The six-phase machine is configured as a combination of a first three-phase machine and a second three-phase machine. Each of the plurality of control vectors is generated by combining two phase vectors from the six-phase machine, where one phase vector is selected from the first three-phase machine and another phase vector is selected from the second three-phase machine. The system and method also include implementing a control method
(Continued)

based on the plurality of control vectors to control the operation of the six-phase machine.

17 Claims, 8 Drawing Sheets

(51) Int. Cl.
    *H02P 23/12*     (2006.01)
    *H02P 25/22*     (2006.01)

(58) Field of Classification Search
    USPC .......................................................... 318/494
    See application file for complete search history.

(56) References Cited

U.S. PATENT DOCUMENTS

| | | |
|---|---|---|
| 10,103,643 B2 | 10/2018 | Zhao et al. |
| 10,137,790 B2 | 11/2018 | Wang et al. |
| 2007/0120520 A1 | 5/2007 | Miyazaki |
| 2008/0150455 A1* | 6/2008 | Shinmura ............... H02K 11/33 |
| | | 310/198 |
| 2009/0128076 A1* | 5/2009 | Taniguchi ............... H02P 25/22 |
| | | 318/400.41 |
| 2011/0080125 A1* | 4/2011 | Shimada ............. H02P 21/0003 |
| | | 318/400.09 |
| 2016/0365821 A1* | 12/2016 | Hustedt ................. H02P 27/085 |
| 2017/0264226 A1* | 9/2017 | Santamaria ............. H02P 25/22 |
| 2020/0044595 A1* | 2/2020 | Williams ................ H02P 21/18 |
| 2020/0144948 A1 | 5/2020 | Nishijima et al. |

FOREIGN PATENT DOCUMENTS

| | | |
|---|---|---|
| DE | 10346060 A1 | 5/2005 |
| EP | 3649731 A1 | 5/2020 |
| WO | 2019030138 A1 | 2/2019 |

OTHER PUBLICATIONS

International Search Report and Written Opinion for International patent application No. PCT/US2021/055211, filed Oct. 15, 2021, mailed Jan. 11, 2022.

* cited by examiner

SYSTEMS AND METHODS FOR CONTROL OF MULTI-PHASE MACHINES

CROSS-REFERENCE TO RELATED APPLICATIONS

The present application is a U.S. national stage of International Patent Application No. PCT/US2021/055211, filed Oct. 15, 2021, which claims priority to U.S. Provisional Patent Application No. 63/108,481, filed Nov. 2, 2020 and U.S. Provisional Patent Application No. 63/117,547, filed Nov. 24, 2020, the entire disclosures of which are incorporated by reference herein.

FIELD OF THE DISCLOSURE

The present disclosure generally relates to multi-phase electric machines, and more particularly to techniques of controlling and operating multi-phase electric machines.

BACKGROUND OF THE DISCLOSURE

Multi-phase (or N-phase) electric machines are utilized in a variety of applications including electric vehicles. For example, a drive system of an electric vehicle typically includes an alternating current (AC) electric motor driven by a direct current (DC) power source (e.g., a main battery). The AC electric motor is coupled to the DC power source via a power inverter that performs switching functions to convert the DC power to AC power. Various control techniques have been developed for multi-phase electric machines including space vector modulation and sine-triangle modulation schemes. However, multi-phase space vector modulation is difficult to implement due to need to handle numerous vectors, while sine-triangle modulation is disadvantaged with low voltage utilization. Accordingly, there remains a need to develop other control strategies that can provide both simple implementation and higher voltage utilization.

Multi-phase permanent magnet synchronous motors and/or generators have also been used extensively due to their relatively low cost, high reliability, and robustness as compared to DC drive systems. After the development of power electronics and signal processing systems, and especially with modern techniques of field-oriented vector control, variable speed control of the permanent magnet motor system is readily achievable. However, in some situations, the torque/speed demand for the motor-drive system fluctuates based on different drive cycle condition. Accordingly, further developments in this area are desirable to accommodate for different torque/speed demands without sacrificing performance and efficiency of the system.

SUMMARY

According to some embodiments, the present disclosure provides a system for controlling and operating a multi-phase machine. The system includes a six-phase machine and a controller coupled to the six-phase machine. The six-phase machine is configured as a combination of a first three-phase machine and a second three-phase machine. The controller is configured to generate a plurality of control vectors for the six-phase machine. Each of the plurality of control vectors is generated by combining two phase vectors from the six-phase machine, where one phase vector is selected from the first three-phase machine and another phase vector is selected from the second three-phase machine. The controller is also configured to implement a control method based on the plurality of control vectors to control the operation of the six-phase machine.

In certain embodiments, the six-phase machine is a permanent magnet machine. The controller is configured to determine a change in speed of the permanent magnet machine based on measurements from one of a plurality of sensors coupled to the permanent magnet machine. The controller is also configured to compare the change in speed with a predetermined threshold change in speed. In response to determining that the change in speed is greater than the predetermined threshold change in speed, the controller is configured to determine to switch to either a dual three-phase control mode or a six-phase control mode for the permanent magnet machine based on additional sensor input from the plurality of sensors. The controller is further configured to switch to the dual three-phase control mode or the six-phase control mode as determined. In some embodiments, the additional sensor input includes a state of charge (SOC)/DC voltage measurement of a voltage source coupled with the permanent magnet machine.

According to various embodiments, the permanent magnet machine is coupled to an inverter that is configured to operate as: (a) a pair of three-phase inverters in the dual three-phase control mode or (b) a single six-phase inverter in the six-phase control mode. In certain embodiments, the controller is configured to determine present speed of the permanent magnet machine based on the measurements from the one of the plurality of sensors and compare the present speed with a threshold speed. In response to determining that the present speed is less than the threshold speed, the controller is configured to enable or continue operating the dual three-phase control mode for the permanent magnet machine. In response to determining that the present speed is at or greater than the threshold speed, the controller is configured to enable or continue operating the six-phase control mode for the permanent magnet machine.

In some embodiments, the controller is configured to prevent the switch to the dual three-phase control mode or the six-phase control mode in response to detecting any transmission state change. In certain embodiments, the controller is configured to switch from the six-phase control mode to the dual three-phase control mode in response to detecting a phase loss condition. In some examples, the permanent magnet machine comprises two sets of three-phase windings, and the controller is configured to switch from the three-phase control mode to the six-phase control mode control in response to detecting higher mutual interaction between the two sets of the three-phase windings of the permanent magnet machine.

According to certain embodiments, the present disclosure provides a method for controlling and operating a multi-phase machine. The method includes operating a six-phase machine which is configured as a combination of a first three-phase machine and a second three-phase machine. The method also includes generating a plurality of control vectors for the six-phase machine. Each of the plurality of control vectors is generated by combining two phase vectors from the six-phase machine, where one phase vector is selected from the first three-phase machine and another phase vector is selected from the second three-phase machine. The method further includes implementing a control method based on the plurality of control vectors to control the operation of the six-phase machine.

In some embodiments, the six-phase machine is a permanent magnet machine. The method includes determining a change in speed of the permanent magnet machine based on measurements from one of a plurality of sensors. The method also includes comparing the change in speed with a predetermined threshold change in speed. In response to determining that the change in speed is greater than the predetermined threshold change in speed, the method includes determining to switch to either a dual three-phase control mode or a six-phase control mode for the permanent magnet machine based on additional sensor input from the plurality of sensors. The method further includes switching to the dual three-phase control mode or the six-phase control mode as determined. In certain embodiments, the additional sensor input includes a state of charge (SOC)/DC voltage measurement of a voltage source coupled with the permanent magnet machine.

In some embodiments, the method includes determining present speed of the permanent magnet machine based on the measurements from the one of the plurality of sensors and comparing the present speed with a threshold speed. In response to determining that the present speed is less than the threshold speed, the method includes enabling or continuing to operate, by the controller, the dual three-phase control mode for the permanent magnet machine. In response to determining that the present speed is at or greater than the threshold speed, the method includes enabling or continuing to operate, by the controller, the six-phase control mode for the permanent magnet machine.

In certain embodiments, switching from the six-phase control mode to the dual three-phase control mode is in response to detecting a phase loss condition. In some embodiments, switching from the dual three-phase control mode to the six-phase control mode is in response to detecting higher mutual interaction between two sets of three-phase windings of the permanent magnet machine. In certain examples, the switching to the dual three-phase control mode or the six-phase control mode is permitted only in the absence of any transmission state change.

According to some embodiments, the present disclosure provides a controller for controlling and operating a multi-phase machine. The controller includes a processor and a memory. The memory includes instructions that, when executed by the processor, cause the controller to operate a six-phase machine which is configured as a combination of a first three-phase machine and a second three-phase machine. The processor also causes the controller to generate a plurality of control vectors for the six-phase machine. Each of the plurality of control vectors is generated by combining two phase vectors from the six-phase machine, where one phase vector is selected from the first three-phase machine and another phase vector is selected from the second three-phase machine. The processor further causes the controller to implement a control method based on the plurality of control vectors to control the operation of the six-phase machine.

According to various embodiments, the two phase vectors from the six-phase machine are phase shifted by 90 degrees from each other. In certain embodiments, a first plurality of current vectors is determined from the first three-phase machine and a second plurality of current vectors is determined from the second three-phase machine. In some embodiments, generating the plurality of control vectors includes generating a set of current control vectors. Each current control vector is generated by combining two current vectors with one current vector being selected from the first plurality of current vectors and another current vector being selected from the second plurality of current vectors. In certain embodiments, the set of current control vectors is converted into a set of voltage control vectors. In some embodiments, the set of voltage control vectors is transformed into a first plurality of voltage vectors for the first three-phase machine and a second plurality of voltage vectors for the second three-phase machine. In some examples, the plurality of control vectors includes three control vectors and the control method utilizes the three control vectors to control the operation of the six-phase machine as an equivalent three-phase machine.

DETAILED DESCRIPTION

Figure 1:
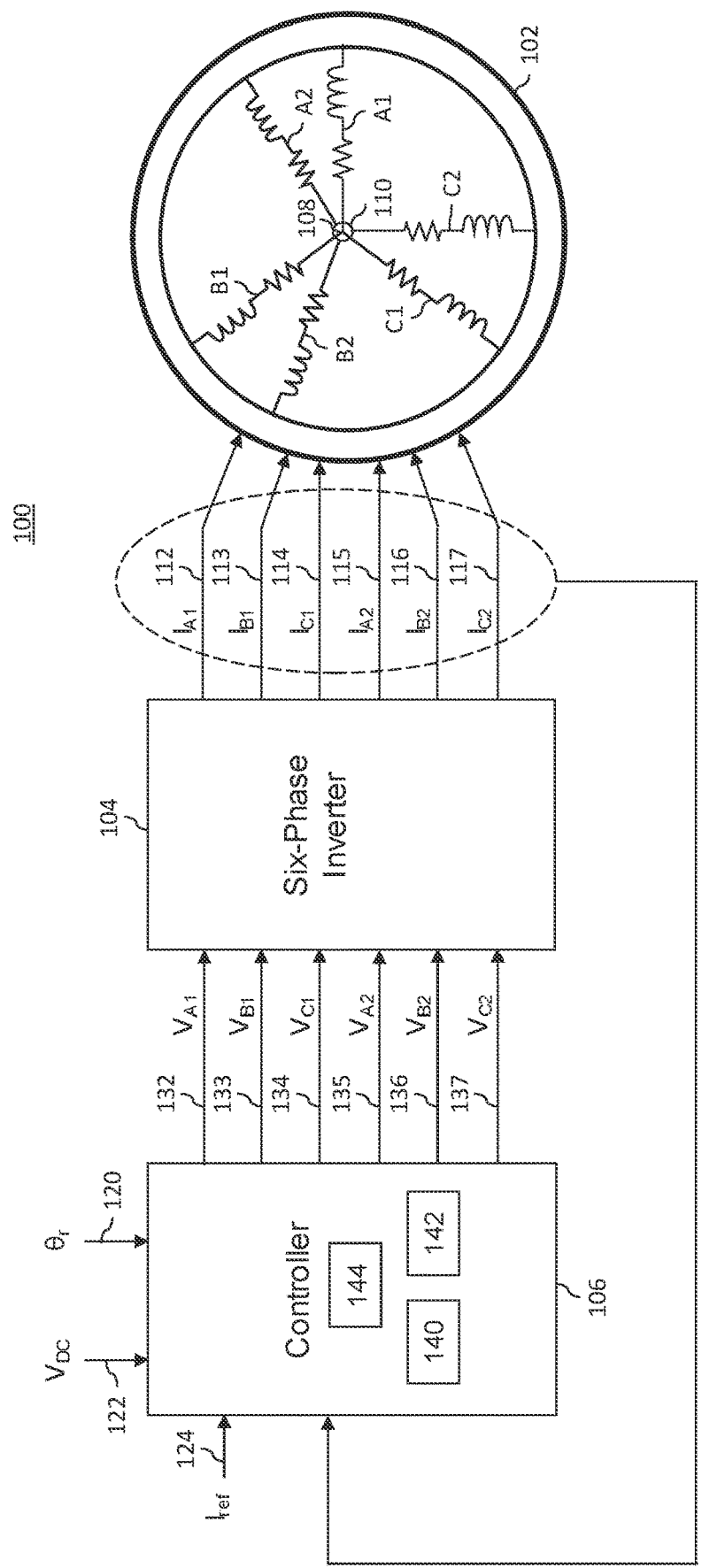
FIG. 1 is a block diagram illustrating a system for operating a six-phase machine.

For the purposes of promoting an understanding of the principles of the present disclosure, reference is now made to the embodiments illustrated in the drawings, which are described below. The embodiments disclosed herein are not intended to be exhaustive or to limit the disclosure to the precise form disclosed in the following detailed description. Rather, these embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

Various embodiments of the present disclosure relate to the control and operation of multi-phase machines. Embodiments depicting systems and methods for phase vector control of a multi-phase machine are described with reference to FIGS. 1-3. Embodiments depicting systems and methods for operating a six-phase permanent magnet machine are described with reference to FIGS. 4-8.

According to some embodiments, a control scheme utilizing phase vectors is deployed to operate a six-phase machine. By using such phase vector control, advantages are realized in terms of minimal vector calculation, simpler design/implementation, and/or higher voltage utilization. In particular, six phase vectors (e.g., current vectors) corresponding to each phase of the six-phase machine are obtained. Adjacent phase vectors that are at right angles (e.g., 90 degrees) to one another are combined to generate a plurality of control vectors. In this manner, three control vectors are derived instead of six. Control strategies are then implemented on the plurality of control vectors to produce six resultant phase vectors (e.g., voltage vectors) that are fed back to regulate the six-phase machine.

Referring to FIG. 1, a block diagram of a system 100 for operating a multi-phase machine is shown including a six-phase AC machine 102, a six-phase inverter 104, and a controller 106. As used herein, the term "AC machine" refers to an AC powered device that converts electrical energy to mechanical energy or vice versa. AC machines can be classified into synchronous AC machines and asynchronous AC machines. Synchronous AC machines can include permanent magnet machines and reluctance machines. In some embodiments, six-phase AC machine 102 is a six-phase asymmetric interior permanent magnet synchronous AC motor used to provide torque in an electric vehicle. However, it should be appreciated that the disclosed embodiments can relate to other types of multi-phase electric machines in the context of other applications.

Six-phase AC machine 102 has six windings A1, B1, C1, A2, B2 and C2, with each being associated with a respective phase of six-phase AC machine 102. Windings A1-C1 are coupled together at a first neutral connection 108, while windings A2-C2 are coupled together in a second neutral connection 110. First and second neutral connections 108, 110 are electrically isolated thereby making six-phase AC machine 102 asymmetric in nature. With this setup, six-phase AC machine 102 is configured as a combination of two three-phase machines. That is, windings A1-C1 comprise a first three-phase machine, and windings A2-C2 comprise a second three-phase machine. In various embodiments, the two sets of windings are shifted from one another by a phase value (e.g., 30 degrees) to improve torque performance.

Windings A1-C1 and A2-C2 represent a stator of six-phase AC machine 102. For ease of illustration, the stator and other components (e.g., rotor, shaft, etc.) of six-phase AC machine 102 are not shown. Generally, the rotor is mounted to the shaft and the rotor is separated from the stator by an air gap. When utilized as a motor, the stator causes the rotor to rotate utilizing electrical energy thereby rotating the shaft to provide mechanical energy. On the other hand, when utilized as a generator, the shaft is rotated by an external mechanical force that causes the rotor to rotate thereby causing the stator to generate electrical energy.

Six-phase inverter 104 includes, among other things, switching devices (e.g., transistors, diodes, etc.) to appropriately switch DC voltages and provide energization to windings A1-C1 and A2-C2 of six-phase AC machine 102 as known to those skilled in the art. Specifically, six-phase inverter 104 provides stator currents 112-114 to windings A1-C1 and stator currents 115-117 to windings A2-C2.

Controller 106 receives stator currents 112-117 for windings A1-C1 and A2-C2 (e.g., current vectors $I_{A1}$-$I_{C1}$ and $I_{A2}$-$I_{C2}$) as well as reference currents ($I_{ref}$) 124 for windings A1-C1 and A2-C2. Reference currents 124 are command signals that will cause six-phase AC machine 102 to generate a desired torque at a desired rotational speed. Controller 106 also receives a rotor/shaft position ($\theta r$) 120 (e.g., based on measured or estimated information from six-phase AC machine 102), and a DC voltage input ($V_{DC}$) 122 (e.g., from a battery). Using all these inputs, controller 106 generates control voltages 132-137 (e.g., voltage vectors $V_{A1}$-$V_{C1}$ and $V_{A2}$-$V_{C2}$) that are then sent to control the switching operations of six-phase inverter 104 to thereby control the outputs (e.g., 112-117) provided to windings A1-C1 and A2-C2.

Controller 106 includes non-transitory memory 140 having instructions that, in response to execution by a processor 142, cause processor 142 to perform the various functions of controller 106. Non-transitory memory 140, processor 142, and controller 106 are not particularly limited and can, for example, be physically separate.

In some embodiments, controller 106 can form a portion of a processing subsystem including one or more computing devices having memory, processing, and communication hardware. Controller 106 can be a single device or a distributed device, and functions of controller 106 can be performed by hardware and/or as computer instructions on a non-transient computer readable storage medium, such as the non-transitory memory.

In certain embodiments, controller 106 includes one or more interpreters, determiners, evaluators, regulators, and/or processors that functionally execute the operations of controller 106. Interpreters, determiners, evaluators, regulators, and processors can be implemented in hardware and/or as computer instructions on a non-transient computer readable storage medium, and can be distributed across various hardware or computer-based components.

According to some embodiments, controller 106 includes a fault detection unit or module 144 that receives information associated with six-phase inverter 104 and/or six-phase AC machine 102 to determine faults. For example, fault detection module 144 receives information from sensors indicating various characteristics of the currents provided by six-phase inverter 104 to windings A1-C1 and A2-C2 (e.g., amplitude measurements, root mean square measurements, etc.). As an example, fault detection module 144 receives information from sensors indicating the conditions of windings A1-C1 and A2-C2. Fault detection module 144 then processes the received information and determines whether a fault has occurred with respect to one or more phases in six-phase AC machine 102. In some embodiments, fault detection module 144 provides a fault signal to an output unit (e.g., a display, an indicator light, a speaker, etc.) to indicate a detected fault to an observer (e.g., an operator of an electric vehicle). While FIG. 1 shows fault detection module 144 as being a part of controller 106, in certain embodiments, fault detection module 144 may be a separate unit that is communicatively coupled to controller 106.

Figure 2:
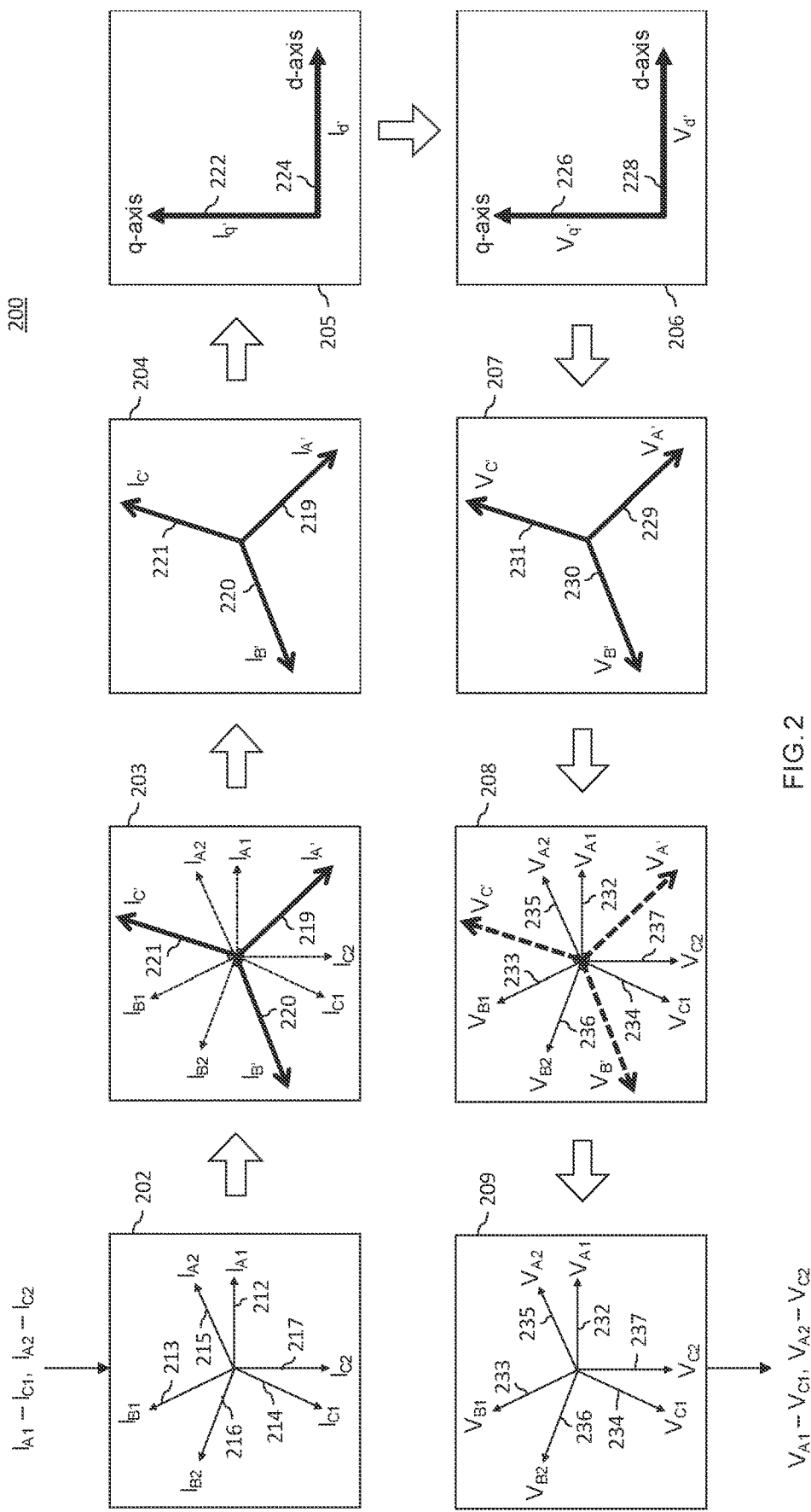
FIG. 2 is a block diagram illustrating a process of implementing phase vector control for the system of FIG. 1.

FIG. 2 shows a block diagram of a process 200 for implementing phase vector control in system 100 of FIG. 1. According to various embodiments, process 200 obtains six current vectors corresponding to each phase of six-phase AC machine 102. Process 200 combines currents vectors that are offset by 90 degrees from one another to generate a set of three control vectors. This transformation allows three control vectors to be used in controlling six-phase AC machine 102 instead of six. Process 200 then implements various control strategies on the three control vectors. Afterward, process 200 converts the three control vectors back to six voltage vectors to be applied to six-phase inverter 104 in order to operate six-phase AC machine 102.

Specifically, process 200 includes process stages 202-209. In some embodiments, process stages 202-209 are implemented or performed by controller 106. At process stage 202, phase vectors from six-phase AC machine 102 are received. Specifically, six current vectors ($I_{A1}$, $I_{B1}$, $I_{C1}$, $I_{A2}$, $I_{B2}$, $I_{C2}$) 212-217 are obtained from six-phase AC machine 102. For example, current vectors 212-214 correspond to stator currents 112-114 for windings A1-C1, while current vectors 215-217 correspond to stator currents 115-117 for windings A2-C2.

At process stage 203, adjacent current vectors that are shifted by 90 degrees from each other are combined (e.g., summed) to generate current control vectors ($I_{A'}$-$I_{C'}$) 219-221. For example, current vectors $I_{A1}$ and $I_{C2}$ are combined to form current control vector 219. As an example, current vectors $I_{C1}$ and $I_{B2}$ are combined to form current control vector 220. For example, current vectors $I_{B1}$ and $I_{A2}$ are combined to form current control vector 221. As shown in process stage 204, three current control vectors $I_{A'}$, $I_{B'}$, and $I_{C'}$ are determined for six-phase AC machine 102.

At process stage 205, current control vectors 219-221 are converted from the stationary reference frame to the synchronous (or rotating) reference frame. This represents a three-phase to two-phase transformation (e.g., d-q transformation). The synchronous reference frame includes direct-axis (d-axis), quadrature-axis (q-axis), and zero-sequence components. Accordingly, current control vectors 219-221 are transformed into intermediate current control vectors ($I_{q'}$) 222 and ($I_{d'}$) 224 in the synchronous reference frame. The process of stationary-to-synchronous conversion is known to those skilled in the art.

Using the pair of current control vectors 222, 224, various control methods can be implemented or applied to control the operation (e.g., flux/torque) of six-phase AC machine 102. In some embodiments, a control method for six-phase AC machine 102 uses a harmonic control technique together with a fundamental control technique for advanced torque ripple minimization.

At process stage 206, intermediate voltage control vectors ($V_{q'}$) 226 and ($V_{d'}$) 228 are generated based on intermediate current control vectors 222, 224 in the synchronous reference frame. This type of current to voltage conversion may be performed by any suitable means, such as by using a proportional-integral (PI) controller and decoupled equation.

At process stage 207, intermediate voltage control vectors 226, 228 are converted from the synchronous reference frame to the stationary reference frame. This represents a reciprocal two-phase to three-phase transformation. Accordingly, intermediate voltage control vectors 226, 228 are transformed into voltage control vectors ($V_{A'}$-$V_{C'}$) 229-231 in the stationary reference frame. The process of synchronous-to-stationary conversion is known to those skilled in the art. According to various embodiments, intermediate voltage control vectors 226, 228 are inputted into a space vector pulse-width modulation (SVPWM) generator to produce voltage control vectors 229-231. SVPWM is control technique used to create AC waveforms that drive three-phase AC powered motors at varying speeds. The use of SVPWM is known to those skilled in the art.

At process stage 208, voltage control vectors 229-231 are decomposed into six voltage vectors ($V_{A1}$, $V_{B1}$, $V_{C1}$, $V_{A2}$, $V_{B2}$, $V_{C2}$) 232-237. For example, voltage control vector 229 is decomposed into voltage vectors $V_{A1}$ and $V_{C2}$. As an example, voltage control vector 230 is decomposed into voltage vectors $V_{C1}$ and $V_{B2}$. For example, voltage control vector 231 is decomposed into voltage vectors $V_{B1}$ and $V_{A2}$.

In various embodiments, decomposition is carried out by multiplying the voltage control vector by a respective angle value. For example, $V_{A1}$ is calculated using $V_A \angle 45°$ and $V_{C2}$ is calculated using $V_A \angle -45°$. Note that a scaling factor of $\sqrt{2}$ will be needed for this transformation if not considered in the previous d-q transformation.

As shown in process stage 209, voltage vectors 232-237 are determined for six-phase AC machine 102. For example, voltage vectors 232-234 correspond to control voltages 132-134 for windings A1-C1, and voltage vectors 235-237 correspond to control voltages 135-137 for windings A2-C2. In some embodiments, voltage vectors 232-237 are sent to six-phase inverter 104 to control the currents provided to windings A1-C1 and A2-C2.

Figure 3:
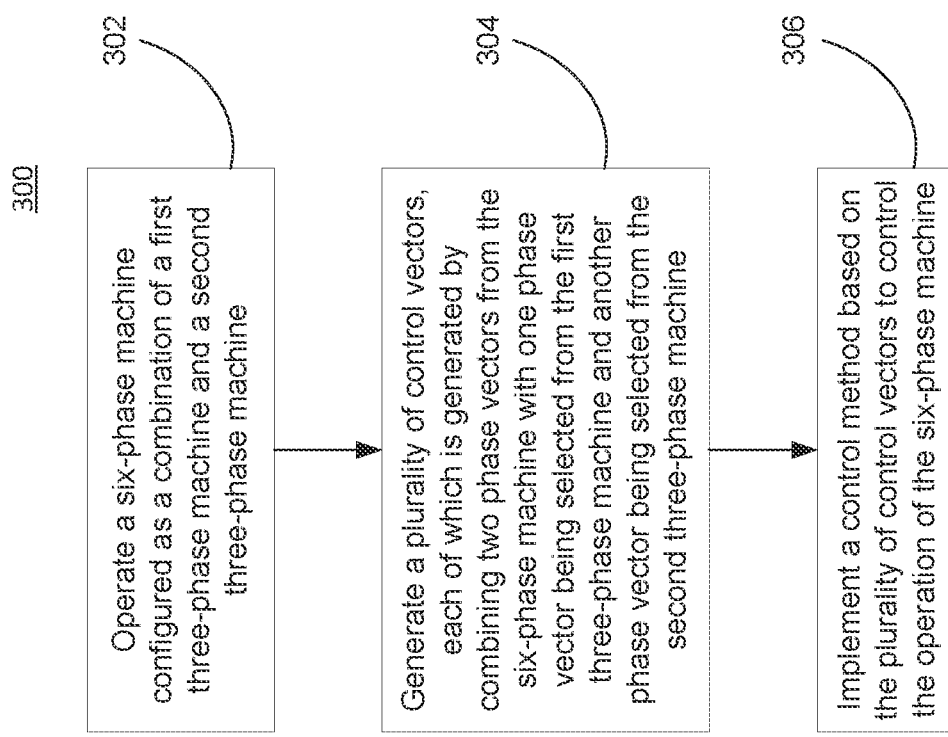
FIG. 3 is a flow chart illustrating a method of providing phase vector control for the system of FIG. 1.

Referring now to FIG. 3, a method 300 of providing phase vector control for a six-phase machine (e.g., 102) is shown. Method 300 can be performed by a controller (e.g., 106). At block 302, the controller operates the six-phase machine which is configured as a combination of a first three-phase machine and a second three-phase machine. With reference to FIG. 1, windings A1-C1 can be associated with the first three-phase machine and windings A2-C2 can be associated with the second three-phase machine.

At block 304, the controller generates a plurality of control vectors. Each of the plurality of control vectors is generated by combining two phase vectors from the six-phase machine, where one of the phase vectors is selected from the first three-phase machine and the other one of the phase vectors is selected from the second three-phase machine. The two phase vectors are adjacent and phase shifted by 90 degrees from each other.

In some embodiments, the controller determines a first plurality of current vectors (e.g., $I_{A1}$, $I_{B1}$, $I_{C1}$) from the first three-phase machine and a second plurality of current vectors (e.g., $I_{A2}$, $I_{B2}$, $I_{C2}$) from the second three-phase machine. As such, generating the plurality of control vectors includes generating a set of current control vectors (e.g., $I_{A'}$, $I_{B'}$, $I_{C'}$). Each current control vector is generated by combining two current vectors with one current vector being selected from the first plurality of current vectors and another current vector being selected from the second plurality of current vectors. The two current vectors are phase shifted by 90 degrees from each other.

In certain embodiments, the controller converts the set of current control vectors into a set of voltage control vectors (e.g., $V_{A'}$, $V_{B'}$, $V_{C'}$). In some embodiments, the controller transforms the set of voltage control vectors into a first plurality of voltage vectors (e.g., $V_{A1}$, $V_{B1}$, $V_{C1}$) for the first three-phase machine and a second plurality of voltage vectors (e.g., $V_{A2}$, $V_{B2}$, $V_{C2}$) for the second three-phase machine.

At block 306, the controller implements a control method based on the plurality of control vectors to control the operation of the six-phase machine. In various embodiments, the plurality of control vectors includes three control vectors. Accordingly, the control method utilizes the three control vectors to control the operation of the six-phase machine as an equivalent three-phase machine.

As described herein, phase vector control techniques offer various advantages such as minimizing vector calculations, simplifying design/implementation, and achieving higher voltage utilization. This enables the use of six-phase AC machine 102 in a variety of applications such as in electric vehicles and the aerospace industry.

According to some embodiments, a control scheme utilizing a dual-three-phase control mode, or a single six-phase control mode is deployed to operate a six-phase permanent magnet machine. By using such flexible control scheme, advantages are realized in terms of increased robustness in the entire range of operation of the six-phase permanent magnet machine.

Figure 4:
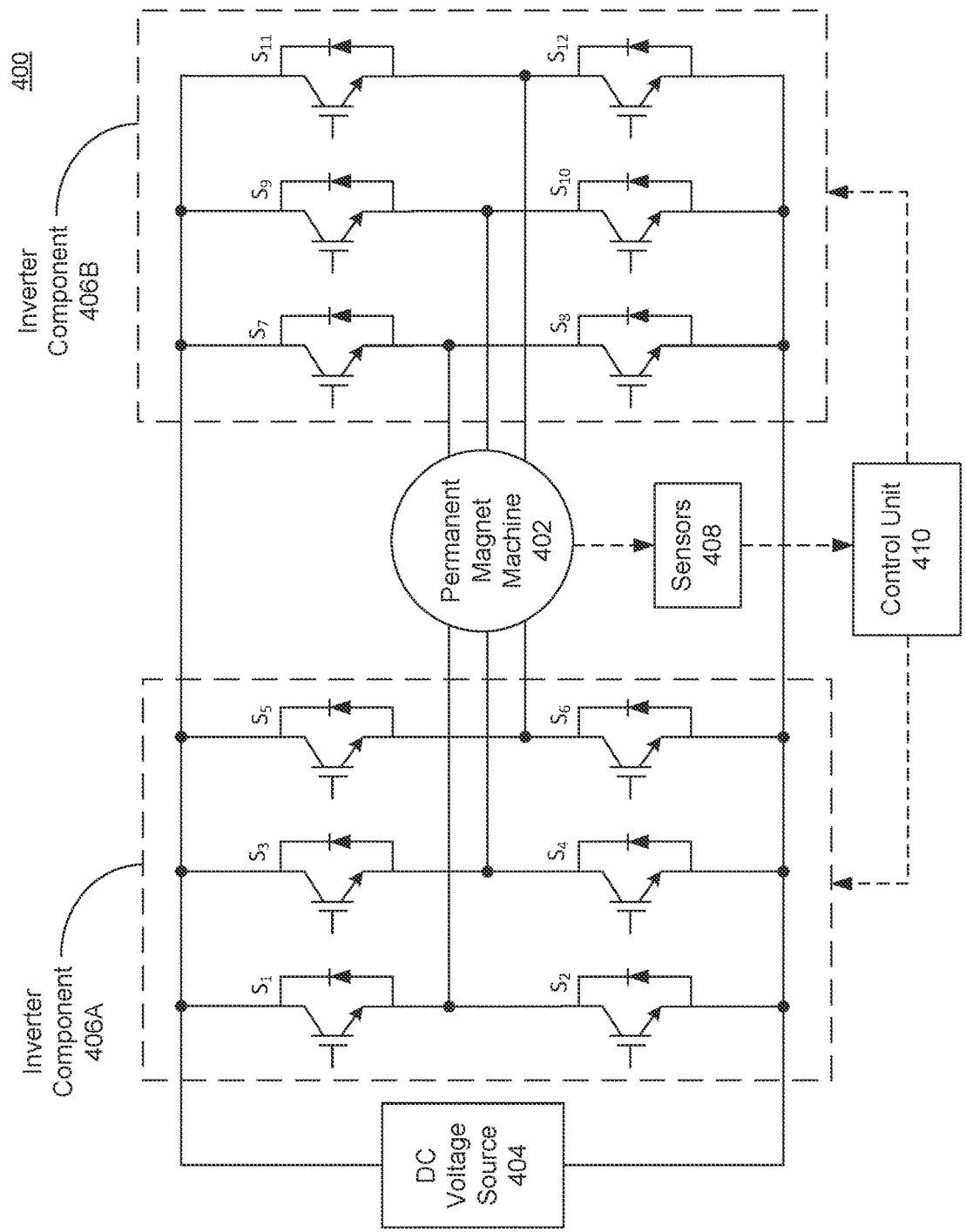
FIG. 4 is a block diagram illustrating a system for operating a six-phase permanent magnet machine.

Referring to FIG. 4, a block diagram of a system 400 for operating a six-phase permanent magnet machine 402 (e.g., a motor) is shown. The energy for operating permanent magnet machine 402 is provided by a DC voltage source 404 (e.g., a battery). Electrically coupled with DC voltage source 404 are a plurality of inverter legs which operate together as an inverter 406. Inverter 406 has two components, a first inverter component 406A and a second inverter component 406B, which may be controlled separately or together to operate permanent magnet machine 402.

In each inverter component, there are three legs, where each leg has two complementary switches. For example, switch $S_1$ and $S_2$ are both switches implemented in the same leg, and when one switch is closed, the other switch is open. First inverter component 406A includes six switches $S_1$ through $S_6$, and second inverter component 406B includes six switches $S_7$ through $S_{12}$. Inverter 406 may be operated as a pair of three-phase inverters or as a single six-phase inverter, controlled by a controller or control unit 410. In some embodiments, control unit 410 is a motor control unit. The switches may be IGBTs, FETs (including MOSFET types), gated thyristors, SCRs, or other suitable gates/switching devices as known to those skilled in the art. In certain embodiments, permanent magnet machine 402 is an asymmetrical or quasi-six-phase permanent magnet motor which has two sets of three-phase permanent magnet motors with a phase-shift of 30 degrees between the two sets, or constructed using two sets of three-phase windings (also referred to as "dual three-phase windings") phase-shifted electrically and mechanically by 30 degrees.

Control unit 410 is electrically coupled with inverter 406 and sensors 408, and each of sensors 408 takes measurements related to permanent magnet machine 402, such as speed, position, and/or current, and transmits the measurement data to control unit 410. Based on the measurement data from sensors 408, and in some examples, other sensors not shown in FIG. 4, control unit 410 transmits control signals to each of the legs of inverter 406.

Control unit 410 is a processing unit which executes operating logic that defines various control, management, and/or regulation functions. This operating logic may be in the form of dedicated hardware, such as a hardwired state machine, programming instructions, and/or a different form as would occur to those skilled in the art. Control unit 410 may be provided as a single component, or a collection of operatively coupled components; and may be comprised of digital circuitry, analog circuitry, or a hybrid combination of both of these types. When of a multi-component form, control unit 410 may have one or more components remotely located relative to the others. Control unit 410 can include multiple processing units arranged to operate independently, in a pipeline processing arrangement, in a parallel processing arrangement, and/or such different arrangement as known to those skilled in the art.

In some embodiments, control unit 410 is a programmable micro-processing device of a solid-state, integrated circuit type that includes one or more processing units and memory. Control unit 410 can include one or more signal conditioners, modulators, demodulators, arithmetic logic units, central processing units, limiters, oscillators, control clocks, amplifiers, signal conditioners, filters, format converters, communication ports, clamps, delay devices, memory devices, and/or different circuitry or functional components as known to those skilled in the art to perform the desired communications. As an example, control unit 410 includes a computer network interface to facilitate communications using the controller area network (CAN) standard among various system components and/or components not included in the depicted system, as desired.

Figure 5:
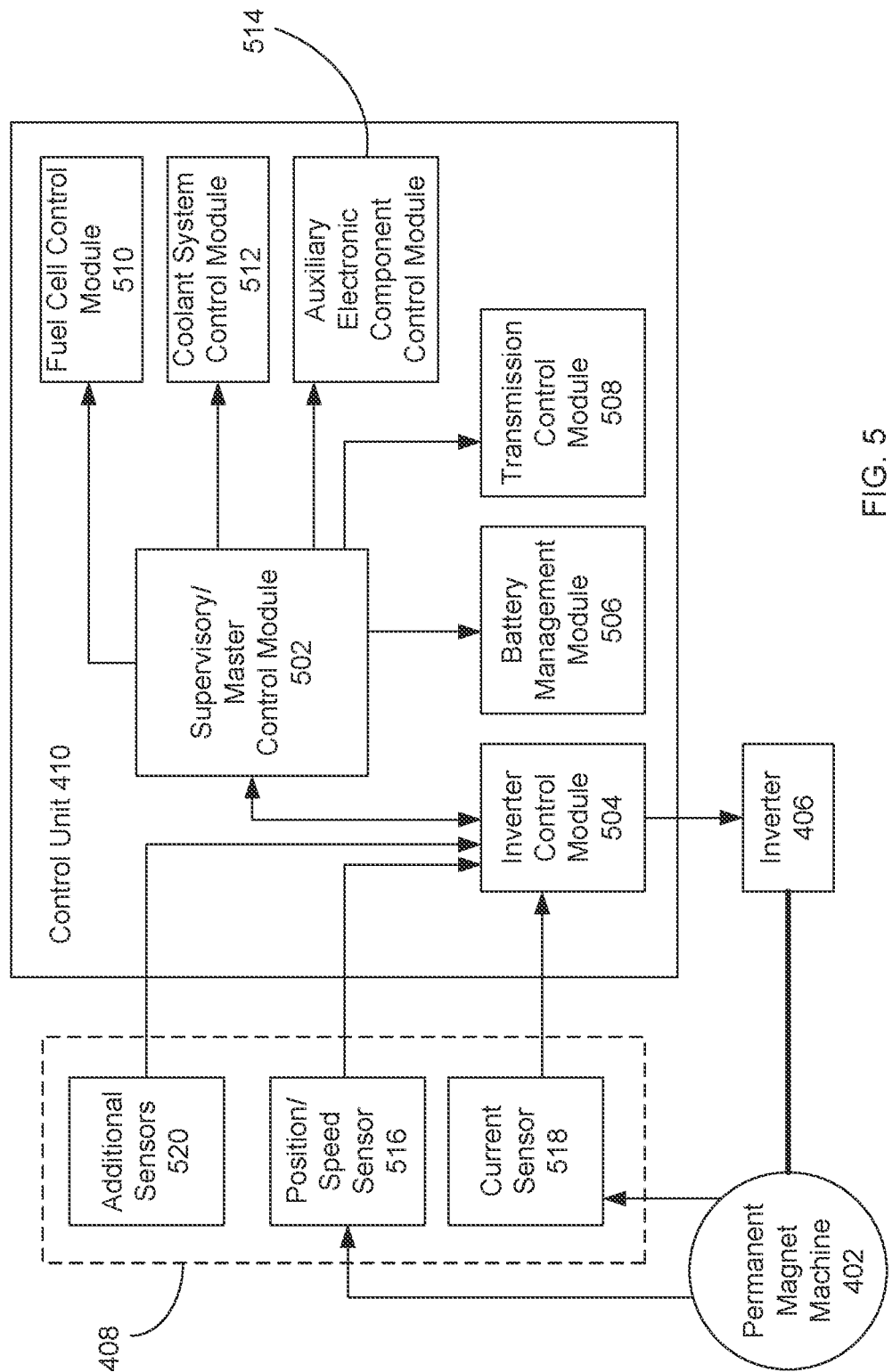
FIG. 5 is a block diagram illustrating a controller for the system of FIG. 4.

FIG. 5 illustrates various components of control unit 410. For example, control unit 410 includes a supervisory or master control module 502 which controls other modules of control unit 410 based on sensor inputs. Such other modules include, but are not limited to, an inverter control module 504, a battery management module 506, a transmission control module 508, a fuel cell control module 510, a coolant system control module 512, and/or an auxiliary electronic component control module 514. In some embodiments, system 400 includes all of these modules, whereas in other embodiments, system 100 includes some of these modules. In certain embodiments, additional types of modules are implemented as being controlled by supervisory control module 502. Regardless of how many modules there may be in system 400, supervisory control module 502 oversees the operation of these modules.

Some examples of sensors 408 are described herein. Sensors 408 include a position or speed sensor 516 and a current sensor 518. Position or speed sensor 516 measures the position or speed of permanent magnet machine 402, and current sensor 518 measures the amount of current flowing through the legs of Inverter 406. Current sensor 518 may be coupled with inverter 406 or permanent magnet machine 402. Additional sensors 520 include SOC sensors and/or DC voltage sensors, transmission shift detection sensors, fuel cell sensors, etc. Sensors 516, 518, and 520 provide measurement information such as the current measurement information, the position or speed measurement information, etc., to inverter control module 504. Inverter control module 504 is the module responsible for transmitting control signals to each of the switches $S_1$ through $S_{12}$ in inverter 406. The sensor information may be transmitted between inverter control module 504 and supervisory control module 502 over a CAN bus, for example, in order to allow supervisory control module 502 to determine torque/speed commands and mode selection, among other functions, based on the sensor information.

Figure 6:
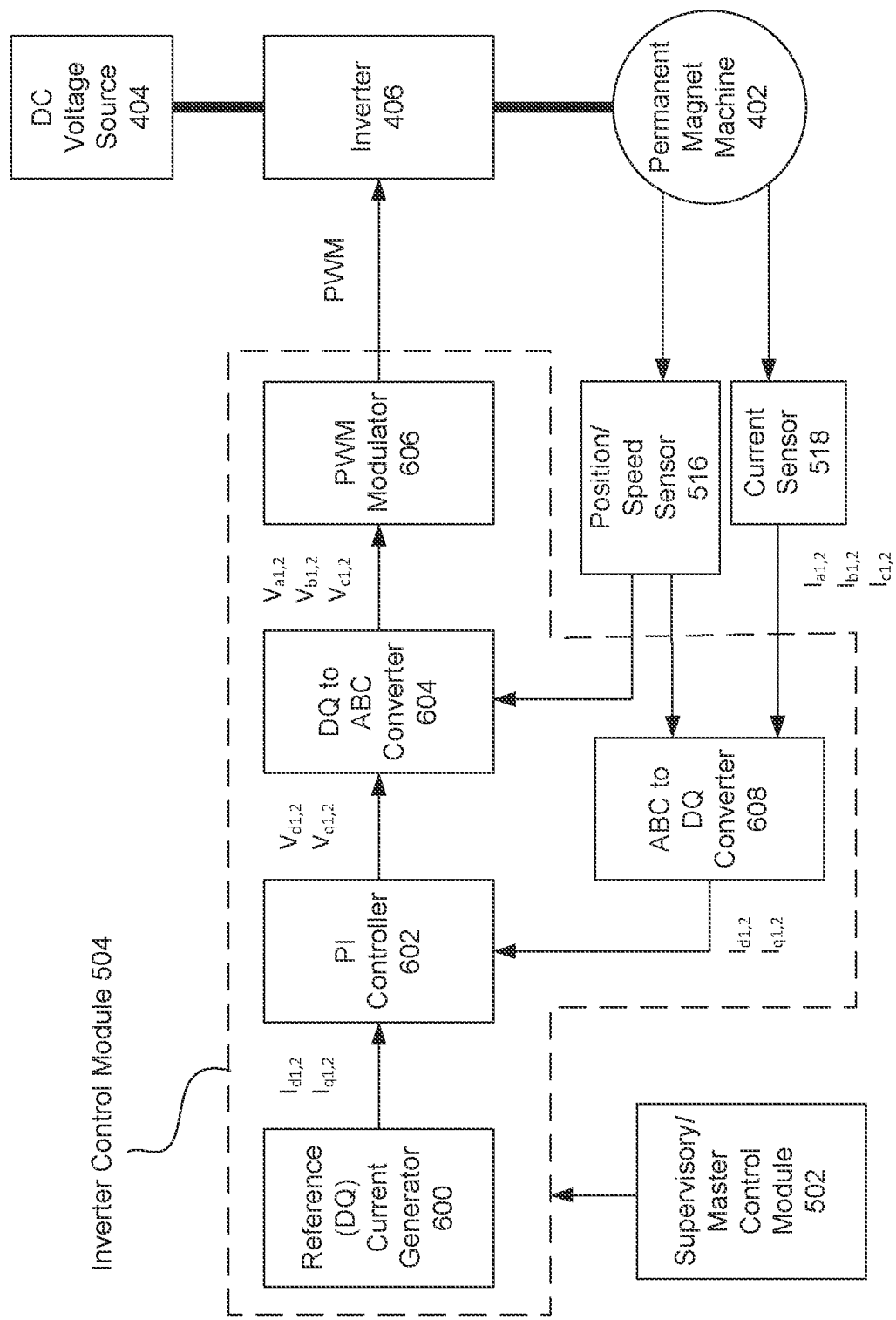
FIG. 6 is a block diagram illustrating components of the controller of FIG. 5.

FIG. 6 illustrates various components within inverter control module 504 as well as how inverter control module 504 operates inverter 406 based on the sensor measurement data. Inverter control module 504 includes a reference direct-quadrature (DQ reference frame) current generator 600, a proportional-integral (PI) controller 602, a DQ-to-ABC (ABC reference frame) converter 604, a pulse-width modulation (PWM) modulator 606, and an ABC-to-DQ converter 608. Reference DQ current generator 600 generates a reference current in DQ reference frame and sends it to PI controller 602, which outputs the voltage in DQ reference frame to be converted into ABC reference frame voltage by converter 604, and PWM modulator 606 receives the converted voltage and outputs a PWM signal to keep the output voltage of inverter 406 at the rated voltage.

Thereafter, the sensor information from position or speed sensor 516 and current sensor 518 are fed back into inverter control module 504. Specifically, position or speed sensor 516 provides measurement data to converters 604 and 608, and current sensor 518 provides the measured current values in ABC reference frame to ABC-to-DQ converter 608. Converter 608 outputs the measured current in DQ reference frame to be inputted into PI controller 602 along with the reference current (also in DQ reference frame) provided by reference current generator 600.

Two control states or modes exist for inverter control module 504: a dual three-phase control mode and a six-phase control mode. The dual three-phase control mode causes module 504 to operate inverter 406 as a pair of three-phase inverters controlled separately. That is, each of inverter components 406A and 406B shown in FIG. 4 is operated as a three-phase inverter. The six-phase control mode causes module 504 to operate both inverter components 406A and 406B as a single six-phase inverter.

In the first case where inverter 406 is operated as a pair of three-phase inverters, reference (DQ) current generator 600 generates four (4) reference currents $I_{d1}$, $I_{q1}$, $I_{d2}$, and $I_{q2}$, or two (2) for each three-phase inverter. Reference current generator 600 then sends these reference currents to PI controller 602 in which each of the currents is converted into the respective DQ voltage, that is, $I_{d1}$, $I_{q1}$, $I_{d2}$, and $I_{q2}$ are converted into $V_{d1}$, $V_{q1}$, $V_{d2}$, and $V_{q2}$, respectively.

Converter 604 converts the voltages from DQ reference frame to ABC reference frame, thus providing the following six (6) voltage values: $V_{a1}$, $V_{b1}$, $V_{c1}$, $V_{a2}$, $V_{b2}$, and $V_{c2}$. PWM modulator 606 uses the voltage values in ABC reference frame to perform the modulation, which in some examples is a three-phase space vector modulation for each three-phase inverter, or any other suitable three-phase PWM control algorithm. That is, PWM modulator 606 uses the algorithm to control each of the switches in inverter 406 such that permanent magnet machine 402 virtually operates as dual three-phase electric machines as a result of inverter components 406A and 406B controlling the voltage applied to the dual three-phase windings of permanent magnet machine 402.

Position/speed sensor 516 detects or senses the position and/or speed of permanent magnet machine 402 and provides the information to converters 604 and 608, while current sensor 518 detects or senses the three-phase currents from the dual three-phase windings of permanent magnet machine 402 as described above and provides the sensed current information, which is in the ABC reference frame, to converter 608. A total of six (6) current values are sensed: $I_{a1}$, $I_{b1}$, and $I_{c1}$ from the first three-phase electric machine and $I_{a2}$, $I_{b2}$, and $I_{c2}$ from the second three-phase electric machine. Converter 608 converts these current values into DQ reference frame, or $I_{d1}$, $I_{q1}$, $I_{d2}$, and $I_{q2}$, which are then fed into PI controller 602 along with the output from reference current generator 600.

Although FIG. 6 is shown with a single loop for simplicity, it should be understood that there may be a separate loop for each three-phase inverter. That is, there may be a pair of separate PI controllers, DQ-to-ABC converters, PWM modulators, current sensors, and ABC-to-DQ converters, where each loop is operated independently of each other but controlled by inverter control module 504, where each loop pertains to one of the two three-phase electric machines that are being operated. In such examples, the first DQ-to-ABC converter converts $V_{d1}$ and $V_{q1}$ into $V_{a1}$, $V_{b1}$, and $V_{c1}$, and the second DQ-to-ABC converter converts $V_{d2}$ and $V_{q2}$ into $V_{a2}$, $V_{b2}$, and $V_{c2}$. However, even when there are two separate loops, the position/speed information of permanent magnet machine 402 as detected by position/speed sensor 516 is shared simultaneously to converters 604 and 608 of both loops such that each converter can make the correct determination based on the inputted position/speed information.

In the second case where inverter 406 is operated as a single six-phase inverter, reference (DQ) current generator 600 generates two (2) reference currents $I_d$ and $I_q$. Reference current generator 600 then sends these reference currents to PI controller 602 in which $I_d$ and $I_q$ are converted into $V_d$ and $V_q$, respectively. Converter 604 converts the voltages from DQ reference frame to ABC reference frame, providing the following six (6) voltages: $V_{a1}$, $V_{b1}$, $V_{c1}$, $V_{a2}$, $V_{b2}$, and $V_{c2}$. PWM modulator 606 uses the voltage values in ABC reference frame to perform the modulation, which in some examples is a six-phase sinusoidal PWM, or any other suitable six-phase PWM control algorithm. That is, PWM modulator 606 uses the algorithm to control each of the switches in inverter 406 such that permanent magnet machine 402 operates as a six-phase machine.

Position/speed sensor 516 detects or senses the position and/or speed of permanent magnet machine 402 and provides the information to converters 604 and 608, while current sensor 518 detects or senses the six-phase currents of the six-phase electric machine and provides the sensed current information, which is in the ABC reference frame, to converter 608. A total of six (6) current values are sensed: $I_{a1}$, $I_{b1}$, $I_{c1}$, $I_{a2}$, $I_{b2}$, and $I_{c2}$. Converter 608 converts these current values into DQ reference frame, or $I_d$ and $I_q$, which are then fed into PI controller 602 along with the output from reference current generator 600.

The position/speed information plays a vital role in converters 604 and 608 because this information is used by converters 604 and 608 to determine the number of separate current or vector values that are to be handled by each converter. That is, the output from converters 604 and 608 determine whether permanent magnet machine 402 is to be operated as a pair of three-phase electric machines as in the first case or a single six-phase electric machine as in the second case.

The determination of how to operate permanent magnet machine 402 relies upon the measured speed of permanent magnet machine 402, such that different speeds are implemented with different controls to obtain optimal control efficiency.

At low speeds (e.g., below a threshold speed), there is a need for more torque and therefore higher current. For example, when a vehicle is traveling uphill at a low speed, there would be a need for maximum torque and current. In some examples, the low speed means more transients in the status of the vehicle, such as stop and starts at regular intervals. Therefore, the dual three-phase mode is preferred because the dual three-phase mode can provide greater torque with low cross-coupling effect in the current components in DQ reference frame. The dual three-phase mode also has more fault-tolerant capability and flexibility at low speed.

At high speeds (e.g., above the threshold speed), there is a need for more power with less torque, and there also exists stronger phase coupling. High cross-coupling voltages between DQ axis current loops lead to high frequency harmonics present in the stator currents and transient current errors which deteriorate the system performance, especially for low PWM pulse-ratio applications. Therefore, when the speed is above the threshold speed, the six-phase mode is preferred because the six-phase mode can provide greater power and has a lower risk of cross-coupling at higher speed, and less torque is needed. As such, the ability to switch from one control mode to another based on the measured speed overcomes the cross-coupling effect and obtains the maximum torque in a hybridized configuration which in turn provides improved performance for permanent magnet machine 402.

Moreover, in some examples, supervisory control module 502 transmits torque and/or speed command signals to inverter control module 504. Supervisory control module 502 also transmits mode selection signals to inverter control module 504. Each of the mode selection signals includes start time, stop time, and selection of a specific mode. In certain embodiments, the selectable modes include a torque mode, a voltage mode, a speed mode, a discharge mode, and so on. In each mode, a selected feature (e.g., torque, voltage, speed, discharge, etc.) is emphasized over the other features during the operation of the system between the start time and the stop time as controlled by the mode selection signal.

Figure 7:
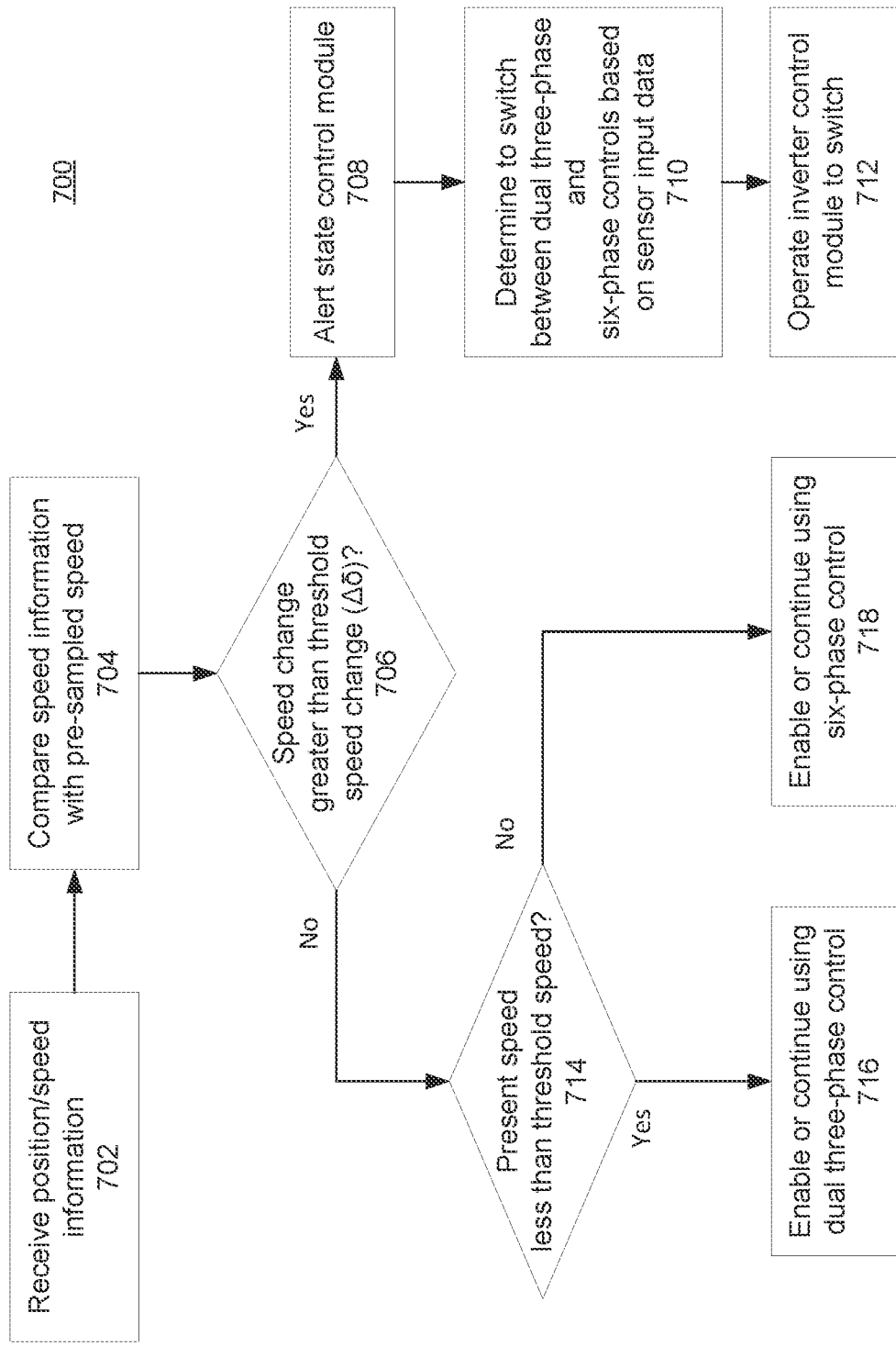
FIG. 7 is a flow chart illustrating a method of operating the system of FIG. 4.

Referring now to FIG. 7, a method 700 for controlling the operation of a six-phase permanent magnet machine (e.g., 402) is shown. Method 700 may be implemented in a control unit (e.g., 410). For example, in inverter control module 504 of control unit 410 as shown in FIG. 5. In step 702, the control unit receives from sensors (e.g., 408) the position or speed information of the permanent magnet machine. If the position information is obtained, the control unit can calculate the speed information from the changes in the position information.

In response to receiving the speed information or calculating the same from the position information, in step 704, the control unit compares the speed information with pre-sampled speed information, or the previously measured speed information which may be stored in a memory unit operatively coupled with the control unit. In step 706, the control unit determines whether the speed change as determined from step 704 is greater than a threshold speed change ($\Delta\delta$). For example, the speed change includes instances where the speed increases or decreases significantly, where the threshold speed change $\Delta\delta$ is predetermined or calculated by the control unit as suitable.

If the speed change is greater than the threshold $\Delta\delta$, the control unit alerts a state control module in step 708. The state control module is defined as one or more module responsible for controlling whether the inverter is to function as a single six-phase inverter or dual three-phase inverters. In some embodiments, such as control unit 410 shown in FIG. 5, the state control module includes inverter control module 504 which receives some control signals from supervisory control module 502. It is to be understood that in other embodiments, there may be fewer or greater number of separately operating modules which are included in the state control module, as suitable.

Figure 8:
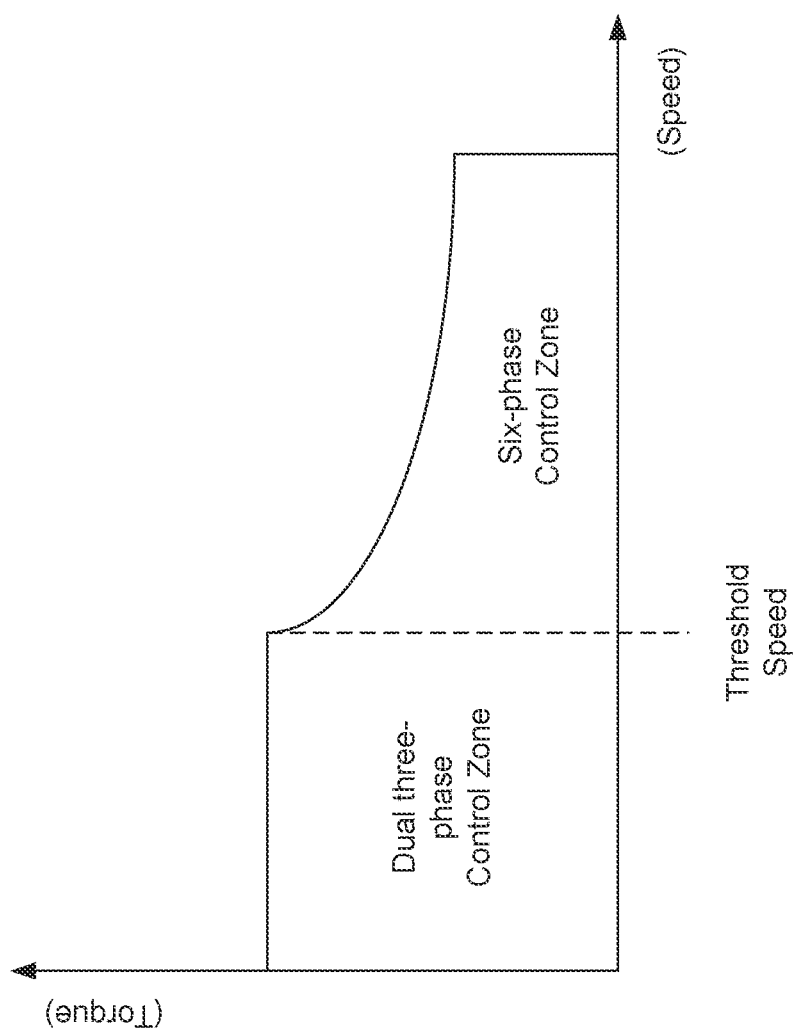
FIG. 8 is a graph illustrating different control zones for torque versus speed.

In certain embodiments, the threshold speed change $\Delta\delta$ is either predetermined or dynamically calculated by the control unit. For example, the control unit determines the threshold speed change $\Delta\delta$ as the difference between the speed of the electric machine as previously measured and the base or threshold speed, such that when a speed change greater than the threshold $\Delta\delta$ is detected, the control unit understands that there may be a need to switch between the two aforementioned controls, since the speed of the electric machine would be crossing the base speed to the other control zone, as shown in FIG. 8.

When the state control module is alerted of the speed change, the control unit determines in step 710 to switch between the dual three-phase and the single six-phase control modes based on the sensor input data, after which in step 712 the inverter control module 504 is operated to switch to the determined control.

The sensor input data includes any sensor information measured by the additional sensors (e.g., 520) other than the position/speed sensor previously described. According to various embodiments, the sensor information to be used in step 710 includes one or more of battery voltage information (e.g., the SOC information or the DC bus voltage measurement information), fuel cell state information, transmission state information, coolant system state information, auxiliary electronic component state information, etc.

For example, when the voltage of the battery that provides energy to the permanent magnet machine is below a threshold voltage, inverter control module 504 may determine to not switch to the single six-phase control mode when the machine is presently operating at the dual three-phase control mode. As an example, when a transmission state change is detected, the switching between the two modes may be prevented in order to avoid successive transient (e.g., vehicle stopping). For example, in the event of a phase loss (i.e., when one phase of a multi-phase system is lost, causing excessive current to be drawn on the remaining phases which can quickly overheat the motor windings), the operation may be switched from a single six-phase mode to a dual three-phase mode in order to continue operating solely as a three-phase system.

In some examples, in the event of higher mutual interaction between the dual three-phase windings of the permanent magnet machine, the operation may be switched from the dual three-phase mode to the single six-phase mode of operation, in order to reduce such interaction. The degree of mutual interaction may be calculated by the control unit (e.g., inverter control module 504) based on the current measurements taken by current sensor 518 and preset or predetermined inductance information.

Alternatively, if the speed change is at or below the threshold speed change in step 706, the control unit then determines in step 714 if the present speed is less than the threshold speed. The threshold speed is defined as the base speed or corner speed of the rotor at which the machine is more prone to the occurrence of cross-coupling between the DQ currents when the six-phase permanent magnet machine is operating at the increased speed above the threshold. If the present speed is less than the threshold speed, in step 716, the dual three-phase control mode is used (e.g., enable the dual three-phase control mode if not, and if it is already enabled, continue using it). Otherwise, in step 718, the six-phase control mode is used (e.g., enable the six-phase control mode if not, and if it is already enabled, continue using it).

FIG. 8 shows an example of a torque curve with respect to the speed of a motor, as well as the control zones that apply to each torque value. If the speed is below the threshold speed (alternatively referred to as rated speed, base speed, or corner speed), the dual three-phase control mode is enabled (also referred to as maximum torque per ampere (MTPA) zone). If the speed is above the threshold speed, the single six-phase control mode is enabled (also referred to as field-weakening (FW) zone). In a field-oriented control technique to control the torque and speed of a permanent magnet machine (e.g. an electric motor), the maximum speed, referred to as the "base speed", is limited by the stator voltages, rated current, and back emf. Beyond the base speed, the back emf is greater than the supply voltage. If the d-axis stator current ($I_d$) is set to a negative value, the rotor flux linkage reduces, allowing the motor to run above the base speed. This operation is known as FW control.

Referring back to FIG. 7, in some embodiments, steps 708, 710, and 712 which take place in response to determining in step 716 that the speed change is greater than the threshold speed change, are operated independently of the present speed of the permanent magnet machine. For example, if inverter control module 504 determines in step

710 that either the dual three-phase or single six-phase control mode is to be enabled, the switching to the determined control state is enabled regardless of the present speed which may be measured by the sensors. This is because inverter control module 504 takes priority in other sensor information such as the battery voltage. As an example, if the six-phase control mode is enabled and the battery SOC is detected as being too low, even if the present speed is high, the dual three-phase control mode may be implemented in order to provide higher voltage utilization.

In certain embodiments, inverter control module 504 may detect a higher risk of the switches experiencing greater stress due to the higher harmonics effect, therefore potentially leading to electrical isolation faults. In such case, inverter control module 504 may determine whether to operate in the six-phase control mode or the dual three-phase control mode based on the severity of the harmonics effect.

Advantages of using the flexible control scheme in the six-phase permanent magnet machine include increased robustness in the operation of the permanent magnet machine by incorporating the flexibility of having either the dual three-phase control mode or the single 6-phase control mode as suitable situations arise. With the option of changing from one state or mode to another state or mode when the circumstances call for a change in the state of control, flexibility is added to the design of the permanent magnet machine. This in turn increases its efficiency when incorporated in electric vehicles, trains, airplanes, or any other suitable implementation know in the art.

For example, the dual three-phase control mode is beneficial because of the more fault-tolerant capability at low speed as well as having more flexibility over individual three-phase control mode at low speed. On the other hand, the single six-phase control mode is beneficial because it experiences less phase coupling at high speed. The present disclosure enables both benefits to be incorporated into a single system that switches from one control mode to another at the appropriate timing as determined based on the speed of the permanent magnet machine.

Additional exemplary embodiments of the foregoing aspect of the present disclosure are described in the following.

A method of operating a six-phase permanent magnet machine includes determining a change in speed of the permanent magnet machine based on measurements from one of a plurality of sensors, comparing the change in speed with a predetermined threshold change in speed, in response to determining that the change in speed is greater than the predetermined threshold change in speed, determining to switch to either a dual three-phase control mode or a six-phase control mode for the permanent magnet machine based on additional sensor input from the plurality of sensors, and switching to the dual 3-phase control mode or the 6-phase control mode as determined.

The method further includes determining present speed of the permanent magnet machine based on the measurements from the one of the plurality of sensors, comparing the present speed with a threshold speed, in response to determining that the present speed is less than the threshold speed, enabling or continuing to operate the dual three-phase control mode for the permanent magnet machine, and in response to determining that the present speed is at or greater than the threshold speed, enabling or continuing to operate the six-phase control mode for the permanent magnet machine.

The method further includes switching from the six-phase control mode to the dual three-phase control mode in response to detecting a phase loss condition.

The method further includes switching from the dual three-phase control mode to the six-phase control mode in response to detecting higher mutual interaction between two sets of six-phase windings of the permanent magnet machine.

Further, the switching to the dual three-phase control mode or the six-phase control mode is permitted only in the absence of any transmission state change.

Further, an inverter is operatively coupled with the permanent magnet machine. The inverter is configured to operate as: (a) a pair of three-phase inverters in the dual three-phase control mode or (b) a single six-phase inverter in the six-phase control mode. Further, the additional sensor input includes a SOC/DC voltage measurement of a voltage source coupled with the permanent magnet machine.

A permanent magnet machine system includes a six-phase permanent magnet machine. The system also includes an inverter coupled with the permanent magnet machine and a plurality of sensors coupled with the permanent magnet machine. A control unit is coupled with the at least one sensor and the inverter. The control unit is configured to determine a change in speed of the permanent magnet machine based on measurements from one of the plurality of sensors, compare the change in speed with a predetermined threshold change in speed, in response to determining that the change in speed is greater than the predetermined threshold change in speed, determine to switch to either a dual three-phase control mode or a six-phase control mode for the permanent magnet machine based on additional sensor input from the plurality of sensors and switch to the dual three-phase control mode or the six-phase control mode as determined.

The control unit is further configured to determine present speed of the permanent magnet machine based on the measurements from the one of the plurality of sensors, compare the present speed with a threshold speed, in response to determining that the present speed is less than the threshold speed, enable or continue operating the dual 3-phase control mode for the permanent magnet machine, and in response to determining that the present speed is at or greater than the threshold speed, enable or continue operating the 6-phase control mode for the permanent magnet machine.

The control unit is further configured to prevent the switch to the dual three-phase control mode or the six-phase control mode in response to detecting any transmission state change. The control unit is further configured to switch from the six-phase control mode to the dual three-phase control mode in response to detecting a phase loss condition.

Further, the inverter is configured to operate as: (a) a pair of 3-phase inverters in the dual 3-phase control mode or (b) a single 6-phase inverter in the 6-phase control mode. The additional sensor input includes a SOC/DC voltage measurement of a voltage source coupled with the permanent magnet machine.

Further, the permanent magnet machine comprises two sets of three-phase winding, and the control unit is configured to switch from the three-phase control mode to the six-phase control mode control in response to detecting higher mutual interaction between the two sets of the three-phase windings of the permanent magnet machine.

Any of the steps of the above-mentioned methods is used to control the electrification process of the electric vehicle.

A vehicle comprises a controller including a processor and a memory having processing instructions operable, when executed by the processor, to implement any of the above-mentioned methods.

This application is intended to cover any variations, uses, or adaptations of the present disclosure using its general principles. Further, this application is intended to cover such departures from the present disclosure as come within known or customary practice in the art to which the present disclosure pertains and which fall within the limits of the appended claims.

Furthermore, the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
    a six-phase machine configured as a combination of a first three-phase machine and a second three-phase machine, the six-phase machine being a permanent magnet machine; and
    a controller coupled to the six-phase machine, the controller configured to:
    generate a plurality of control vectors, each control vector being generated by combining two adjacent phase vectors with a first of the two adjacent phase vectors being selected from phase vectors of the first three-phase machine and a second of the two adjacent phase vectors being selected from phase vectors of the second three-phase machine;
    implement a control method based on the plurality of control vectors to control operation of the six-phase machine;
    detect a change in speed of the permanent magnet machine based on measurement from one of a plurality of sensors coupled to the permanent magnet machine
    compare the change in speed with a predetermined threshold change in speed;
    in response to the change in speed being greater than the predetermined threshold change in speed, generate a command to switch to either a dual three-phase control mode or a six-phase control mode for the permanent magnet machine based on additional sensor input from the plurality of sensors; and
    switch to the dual three-phase control mode or the six-phase control mode.

2. The system of claim 1, wherein the two adjacent phase vectors are phase shifted by 90 degrees from each other.

3. The system of claim 1, wherein controller is further configured to:
    determine a first plurality of current vectors from the first three-phase machine; and
    determine a second plurality of current vectors from the second three-phase machine.

4. The system of claim 3, wherein the controller is configured to generate the plurality of control vectors by generating a set of current control vectors, each current control vector being generated by combining two adjacent current vectors with a first of the two adjacent current vectors being selected from the first plurality of current vectors and a second of the two adjacent current vectors being selected from the second plurality of current vectors.

5. The system of claim 4, wherein the controller is further configured to:
    convert the set of current control vectors into a set of voltage control vectors;
    transform the set of voltage control vectors into a first plurality of voltage vectors for the first three-phase machine; and
    transform the set of voltage control vectors into a second plurality of voltage vectors for the second three-phase machine.

6. The system of claim 1, wherein the plurality of control vectors includes three control vectors and the control method utilizes the three control vectors to control the operation of the six-phase machine as an equivalent three-phase machine.

7. The system of claim 1, wherein the permanent magnet machine is coupled to an inverter configured to operate as: (a) a pair of three-phase inverters in the dual three-phase control mode or (b) a single six-phase inverter in the six-phase control mode.

8. The system of claim 1, wherein the controller is configured to:
    determine a present speed of the permanent magnet machine based on the measurements from the one of the plurality of sensors;

compare the present speed with a threshold speed; and in response to determining that the present speed is less than the threshold speed, enable or continue operating the dual three-phase control mode for the permanent magnet machine.

9. The system of claim 8, wherein the controller is further configured to:

in response to determining that the present speed is at or greater than the threshold speed, enable or continue operating the six-phase control mode for the permanent magnet machine.

10. The system of claim 1, wherein the additional sensor input includes a state of charge (SOC)/DC voltage measurement of a voltage source coupled with the permanent magnet machine.

11. The system of claim 1, wherein the controller is further configured to prevent the switch to the dual three-phase control mode or the six-phase control mode in response to detecting any transmission state change.

12. The system of claim 1, wherein the controller is further configured to switch from the six-phase control mode to the dual three-phase control mode in response to detecting a phase loss condition.

13. The system of claim 1, wherein the permanent magnet machine comprises two sets of three-phase windings, and the controller is further configured to switch from the dual three-phase control mode to the six-phase control mode in response to detecting higher mutual interaction between the two sets of three-phase windings of the permanent magnet machine.

14. A method, comprising:

operating, by a controller, a six-phase machine configured as a combination of a first three-phase machine and a second three-phase machine, the six-phase machine being a permanent magnet machine;

generating, by the controller, a plurality of control vectors, each control vector being generated by combining two adjacent phase vectors with a first of the two adjacent phase vectors being selected from phase vectors of the first three-phase machine and a second of the two adjacent phase vectors being selected from phase vectors of the second three-phase machine; and implementing, by the controller, a control method based on the plurality of control vectors to control operation of the six-phase machine;

detecting, by the controller, a change in speed of the permanent magnet machine based on measurements from one of a plurality of sensors;

comparing, by the controller, the change in speed with a predetermined threshold change in speed;

in response to the change in speed being greater than the predetermined threshold change in speed, generating a command to switch to either a dual three-phase control mode or a six-phase control mode for the permanent magnet machine based on additional sensor input from the plurality of sensors; and switching, by the controller to the dual three-phase control mode or the six-phase control mode.

15. The method of claim 14, further comprising:

determining, by the controller, a first plurality of current vectors from the first three-phase machine;

determining, by the controller, a second plurality of current vectors from the second three-phase machine; and wherein generating the plurality of control vectors includes generating a set of current control vectors, each current control vector being generated by combining two adjacent current vectors with a first of the two adjacent current vectors being selected from the first plurality of current vectors and a second of the two adjacent current vectors being selected from the second plurality of current vectors.

16. The method of claim 15, further comprising:

converting, by the controller, the set of current control vectors into a set of voltage control vectors.

17. The method of claim 15, further comprising:

determining, by the controller, a present speed of the permanent magnet machine based on the measurements from the one of the plurality of sensors;

comparing, by the controller, the present speed with a threshold speed;

in response to determining that the present speed is less than the threshold speed, enabling or continuing to operate, by the controller, the dual three-phase control mode for the permanent magnet machine; and in response to determining that the present speed is at or greater than the threshold speed, enabling or continuing to operate, by the controller, the six-phase control mode for the permanent magnet machine.

* * * * *